US005693722A

United States Patent [19]

Priddy, Jr. et al.

[11] Patent Number: 5,693,722
[45] Date of Patent: Dec. 2, 1997

[54] METHOD FOR MODIFYING THE BACKBONE OF POLYMERIC RESINS

[75] Inventors: Duane B. Priddy, Jr., Krefeld; Burkhard Köhler, Leverkusen, both of Germany; Robert J. Kumpf, Pittsburgh, Pa.; Harald Pielartzik, Krefeld, Germany

[73] Assignees: Bayer Corporation, Pittsburgh, Pa.; Bayer Aktiengesellschaft, Leverkusen, Germany

[21] Appl. No.: 764,377

[22] Filed: Dec. 13, 1996

Related U.S. Application Data

[63] Continuation-in-part of Ser. No. 674,370, Jul. 2, 1996, Pat. No. 5,637,655, which is a continuation-in-part of Ser. No. 447,333, May 22, 1995, Pat. No. 5,605,979.

[51] Int. Cl.$^6$ ..................................................... C08F 20/00
[52] U.S. Cl. ...................... 525/439; 524/779; 524/783; 524/784; 524/785; 525/437; 525/439; 525/466
[58] Field of Search ...................................... 524/779, 783, 524/784, 785; 525/437, 439, 466

[56] References Cited

U.S. PATENT DOCUMENTS

| | | | |
|---|---|---|---|
| 4,185,009 | 1/1980 | Idel et al. | 260/45.9 |
| 4,605,731 | 8/1986 | Evans et al. | 528/371 |
| 5,097,008 | 3/1992 | Krabbenhoft et al. | 528/371 |
| 5,162,459 | 11/1992 | Krabbenhoft et al. | 528/462 |
| 5,191,038 | 3/1993 | Krabbenhoft et al. | 525/462 |
| 5,281,669 | 1/1994 | Kambour et al. | 525/177 |

OTHER PUBLICATIONS

Chemistry and Physics of Polycarbonate, by Hermann Schell Interscience Publishers John Wiley & Sons, Inc., (month unavailable) 1964, pp. 44–51.

Polycarbonates by William F. Christopher and Daniel W. Fox; Reinhold Publishing Corporation, New York, (month unavailable) 1962, pp. 13–15.

Porter et al in Polym. Eng. Sci.—Mid Jan. 1989, vol. 29, pp. 55–62.

Brunelle et al in Indain Journal of Technology, vol. 31, Apr.–Jun. 1993 pp. 234–246.

J. Amer. Chem. Soc. (month unavailable) 1990, 112, p. 2399.

Warren L. Nachlis in Polymer, vol. 36, No. 27, Aug. 1994, pp. 3643, 35 seq.

*Primary Examiner*—Samuel A. Acquah
*Attorney, Agent, or Firm*—Joseph C. Gil; Aron Preis

[57] ABSTRACT

A process is disclosed whereby a polymeric resin (containing ester and/or carbonate bonds) is readily converted into a resin having a modified molecular structure. Accordingly, a polycyclic carbonate (a monomer or oligomer) is transesterified with the polymer resin in the melt, preferably upon extrusion, optionally in the presence of a catalyst. Significantly, the cyclic carbonates are, by the inventive process, inserted into the structure of the polymer, effecting branching of the molecular structure, a branching which manifests itself in the modified properties of the resin.

7 Claims, No Drawings

METHOD FOR MODIFYING THE BACKBONE OF POLYMERIC RESINS

This is a Continuation-In-Part application of U.S. Ser. No. 08/674,370 filed Jul. 2, 1996 now U.S. Pat. No. 5,637,655 which is a Continuation-In-Part of U.S. Ser. No. 08/447,333 filed May 22, 1995 now U.S. Pat. No. 5,605,979.

BACKGROUND OF THE INVENTION

The invention concerns a transesterification process for modifying a polymeric resin, more particularly, the process concerns a transesterification reaction in the melt between a cyclic carbonate and a polycarbonate or a polyester resin to yield a branched resin.

A process is disclosed whereby a polymeric resin (containing ester and/or carbonate bonds) is readily converted into a resin having a modified molecular structure. Accordingly, a cyclic carbonate (a monomer or oligomer) is transesterified with the polymer resin in the melt, preferably upon extrusion, optionally, in the presence of a catalyst. Significantly, the cyclic carbonate is, by the inventive process, inserted into the structure of the polymer, effecting branching of the molecular structure, a branching which manifests itself in the modified properties of the resin.

Polycarbonates, polyesters and polyestercarbonate resins and methods for their manufacture are known. Transesterification as a method for making polyesters and polycarbonates is also well known. See in this regard Chemistry and Physics of Polycarbonate, by Hermann Schnell Interscience Publishers, John Wiley & Sons, Inc., 1964, pp. 44–51 and in Polycarbonate by William F. Christopher and Daniel W. Fox; Reihhold Publishing Corporation, New York, 1962, pp.13–15. Branched polycarbonates and branching agents useful in their preparation are disclosed in U.S. Pat. No. 4,185,009, the specification of which is incorporated by reference herein.

Three different exchange reactions for esters, carbonates and mixed ester/carbonates have been described: (Porter et al in Polym. Eng. Sci. 1989, 29, 55).

Alcoholysis and acidolysis occur, by definition, between an end-group and the main chain. Generally, transesterification refers to an intermolecular reaction between chains. In the present context, transesterification refers to interchanges between a cyclic carbonate and a carbonate and/or ester bond.

Bayer researchers, Schnell and Bottenbruch, first prepared cyclic oligomeric aromatic carbonates in low yields during the early 1960's. The preparation and reported utilization of low molecular weight, low viscosity cyclic precursors that may be ring-opened to form high molecular weight polymers have been reported by Brunelle et al in Indian Journal of Technology, Vol 31, April–June 1993, pp 234–246 and in J. Amer. Chem. Soc., 1990, 112, 2399. Ring-opening polymerization of such cyclics is reported to lead to complete conversion to high molecular weight linear polymers.

The use of in situ polymerization of bisphenol-A carbonate cyclic oligomers in the preparation of blends with styrene-acrylonitrile copolymer has also been reported— Warren L. Nachlis in Polymer, Vol 36, No. 17, 1994, pp 3643, et seq.

The art also includes U.S. Pat. No. 5,281,669 which disclosed easily flowable blends containing linear polymers and oligomers having an overall cyclic structure, and U.S. Pat. No. 4,605,731 which disclosed a method for preparing polycarbonate resins from homocyclic oligocarbonates, the reaction being catalyzed by a particular borate compound.

Most relevant in the present context is U.S. Pat. No. 5,162,459 which disclosed a blend of polycarbonate with a homocyclic oligocarbonate containing hydroquinone carbonate structural units and a ring-opening polycarbonate formation catalyst. Further, most relevant is U.S. Pat. No. 5,191,038 (and U.S. Pat. No. 5,097,008) which disclosed the preparation of branched polycarbonates by contacting a mixture of aromatic homocyclic oligocarbonate with a polyhydric phenol having more than two hydroxy groups per molecule, with a non-branched linear aromatic polycarbonate, in the presence of a carbonate equilibrium catalyst.

The process of the present invention is characterized in, among others, that a resin containing carbonate and/or ester bonds is transesterified with a polycyclic oligocarbonate, in a process which entails no polyhydric phenol having more than two hydroxy groups per molecule as a reactant. The process which entails the insertion of the polycyclic oligocarbonate into the molecular backbone of the resin, results in the formation of a branched resin. While in the following text the focus is the branching of polycarbonate resins, it is to be understood that the invention is directed to the branching of any polymer resin, the repeat units of which contain carbonate and/or ester bonds.

The present invention is predicated on the finding that certain, specific polycyclic oligocarbonates may advantageously be inserted, by transesterification reaction, in the melt, into the structure of polycarbonates, polyesters or polyestercarbonate resins, resulting in the formation of a branched resin. The resulting properties of the branched resin are determined by the efficiency of the process and by the identity and relative amount of the polycyclic oligocarbonate thus inserted.

It is the objective of the present invention to disclose a process for the branching of resins, the repeat unit of which contains a carbonate and/or ester bonds, enabling the preparation of branched resins.

This and other objectives are attained by the presently disclosed invention as will be disclosed in detail below.

DETAILED DESCRIPTION OF THE INVENTION

Shown below are schematic representations of the inventive process; polycarbonate being but a representative of the resins which may thus be branched. In the context of the present invention, transesterification refers to an intermolecular reaction between chains, more particularly to interchanges between a polycyclic oligocarbonate and a linear resin. Also, in the present context, the term "polycyclic oligocarbonate" refers to a compound or a mixture of compounds which contains at least one residue of a trifunctional and/or tetrafunctional moiety and at least one carbonate bond. According to the schematic representation, a linear polycarbonate resin is transesterified in the melt, for instance, in an extruder, optionally in the presence of a suitable transesterification catalyst, with a specifically structured polycyclic oligocarbonate. The process results in a branched resin.

While the inventors do not wish to be bound by theory, the process of the present invention may be depicted below:

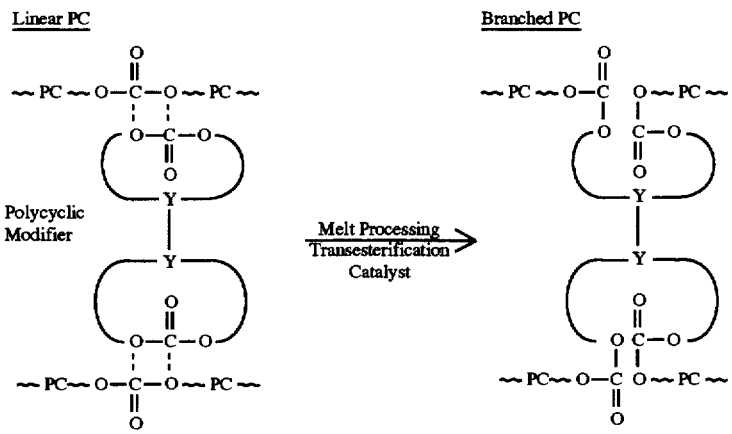

Polycyclic oligocarbonates suitable in the context of the present invention conform to at least one of the structures presented below:

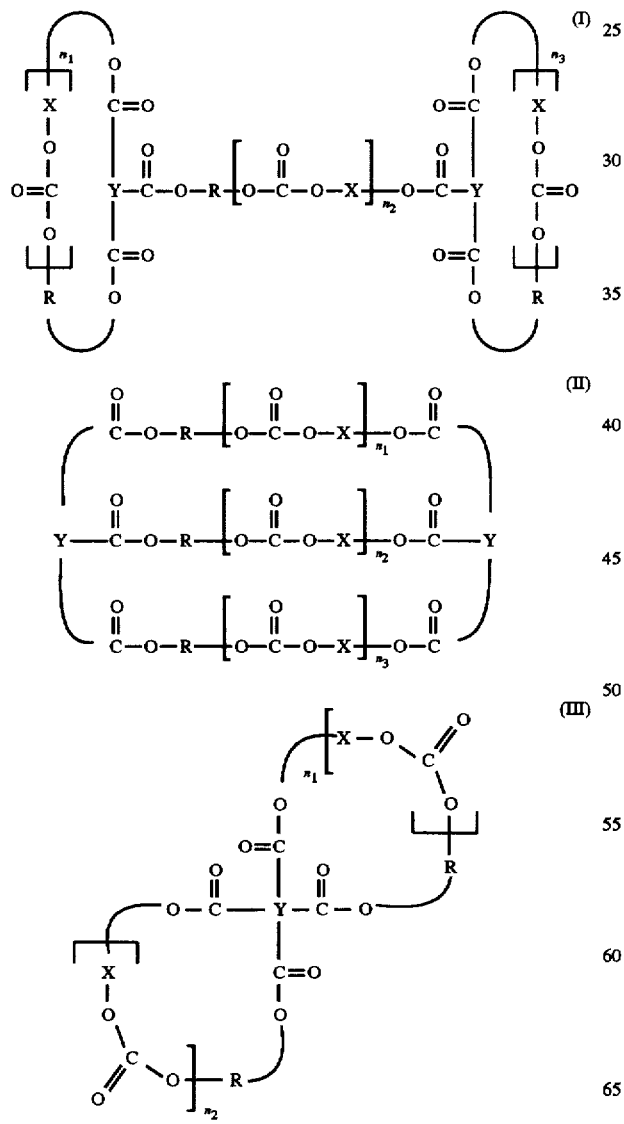

where X and R independently denote an aliphatic, cycloaliphatic or an aromatic residue of a dihydroxy compound or of a bischloroformate; ("residue" as used herein refers to the structure of a bischloroformate without its carbonyl groups or its chlorine atoms, alternatively, to the structure of a dihydroxy compound without the hydroxy groups), Y denotes a trifunctional or a tetrafunctional organic moiety, preferably an aromatic moiety containing about 6 to 80 carbon atoms, optionally containing at least one member selected from the group consisting of hydrogen, oxygen and sulfur atoms, and $n_1$, $n_2$, and $n_3$, independently denote an integer of 0 to 30, preferably 0 to 16.

Examples of suitable moieties are represented below:

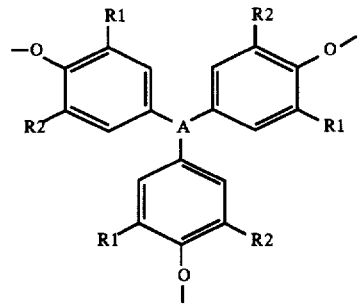

and

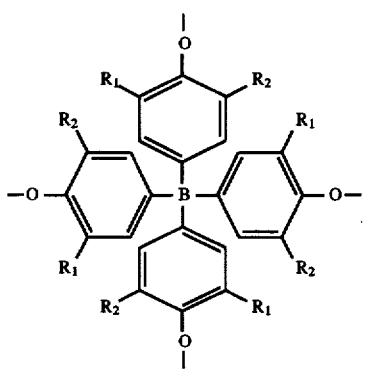

wherein $R_1$ and $R_2$, independently one of the other, denote a hydrogen or $C_{1-18}$-alkyl, preferably hydrogen or methyl, and where A and B each denotes an aliphatic, alicyclic or aromatic group containing up to 30 carbon atoms. Examples are 1,1,1-trihydroxyphenylethane and 1,1,1-trihydroxyphenylmethane, 1,4-bis{α,α-bis(4-hydroxyphenyl)benzyl}-benzene, 1,1,1,1-tetrahydroxyphenylmethane; 1,1,3,3-tetrahydroxyphenylpropane, and 1,1,5,5-tetrahydroxyphenylpentane. Also suitable is the moiety depicted below:

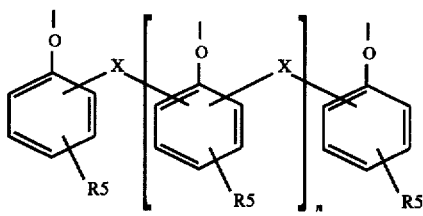

where $R_5$ denotes hydrogen, hydroxy, or $C_1$–$C_{18}$-alkyl, preferably hydrogen or methyl and where X denotes $C_1$–$C_3$ alkylene, sulfur, or a single bond, preferably a methylene. n is 0 to 2 with the proviso that in the case where n is 0, then at least one of the $R_5$ substituents denotes a hydroxy group and further with the proviso that the total hydroxy groups in the molecule does not exceed four. Examples are bis(2,4-dihydroxyphenyl) sulfide and 2,6-bis-(2-hydroxyphenyl-5-methylbenzyl)-4-methylphenol.

Most preferably, the moiety, based on 3,3-bis-(4-hydroxyaryl)oxindoles conforms to

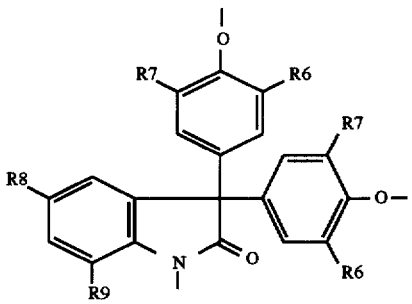

wherein $R_6$ and $R_7$ independently one of the other denote chlorine or bromine, hydrogen, methyl or ethyl groups, especially methyl or hydrogen.

$R_8$ and $R_9$ independently one of the other denote hydrogen, chlorine or bromine, especially hydrogen.

Examples include 3,3-bis-(4-hydroxyphenyl)-oxindole (also referred to as "isatin bisphenol") and 3,3-bis-(4-hydroxy-3-methylphenyl)-oxindole (sometimes referred to as "isatin biscresol").

Polycyclic oligocarbonates which are suitable in the presently disclosed invention may be synthesized by known methods such as have been described in U.S. Pat. Nos. 4,755,586; 4,888,411; and 4,972,039, all incorporated herein by reference.

One method for the preparation of polycyclic oligocarbonates entails a triethylamine-catalyzed hydrolysis/condensation reaction of bischloroformate and a tri- or tetra-hydroxy aromatic compound.

The present invention relates to a transesterification process, reacting a polycarbonate resin with at least one polycyclic oligocarbonate selected from (I), (II) and (III) above, optionally in the presence of a suitable catalyst, carried out in the melt, preferably in an extruder or in other apparatus enabling melt processing of the reactants, preferably at temperatures in the range of 250° to 350° C. and at a residence time sufficient to enable the transesterification reaction, preferably up to about 10 minutes, more preferably up to about 3 minutes, resulting in the insertion of said carbonate in the resin, and attaining a branched resin. Importantly, the process is characterized in the absence of polyhydric phenol having more than two hydroxy groups per molecule, as a reactant.

It is specifically understood that, in view of the disclosure in U.S. Pat. No. 5,191,038, a polyhydric phenol having more than two hydroxy groups per molecule is specifically excluded from among the reactants of the process of the present invention.

The optional catalyst useful in the process of the present invention is selected from the group consisting of dibutyltin oxide, cobalt(II) acetate tetrahydrate, antimony(III) oxide, manganese(II) acetate tetrahydrate, titanium(IV) butoxide, zinc acetate dihydrate, dibutyltin dilaurate, tin(II) acetate, tetramethyldiacetoxystannoxane, tin(IV) oxide, lead(II) acetate trihydrate, dibutyltin diacetate and titanium(IV) bis (ethylacetoacetate).

The polycarbonates suitable for branching in accordance with the inventive process are linear homopolycarbonates and copolycarbonates and mixtures thereof. Such polycarbonate resins are known and their structure and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated herein by reference. These polycarbonates generally have a weight average molecular weight of 10,000–200,000, preferably 20,000–80,000, and their melt flow rate, per ASTM D-1238 at 300° C., is about 1 to about 65 g/10 min., preferably about 2–15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964, all incorporated herein by reference). Dihydroxy compounds suitable for the preparation of the polycarbonates of the invention conform to the structural formulae (1) or (2).

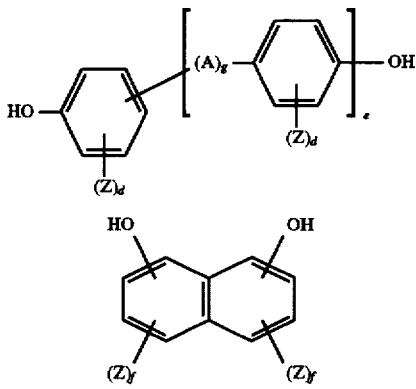

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, or $SO_2$, or

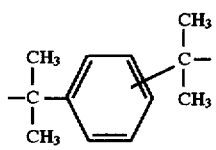

g and e denotes 0 or 1; Z denotes F, Cl, Br or $C_{1-4}$-alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl) propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxybenzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A). The linear polycarbonate resins suitable as reactants in the process of the invention may entail in their structure units derived from one or more of the suitable bisphenols.

Among the linear polycarbonate resins suitable in the practice of the invention are included phenolphthalein-based polycarbonates, copolycarbonates and terpolycarbonates such as are described in U.S. Pat. Nos. 3,036,036 and 4,210,741, both incorporated by reference herein.

In addition to the polycondensation process mentioned above, other processes for the preparation of the polycarbonates of the invention are polycondensation in a homogeneous phase and transesterification. The suitable processes are disclosed in the incorporated herein by reference U.S. Pat. Nos. 3,028,365; 2,999,846; 3,153,008; and 2,991,273. The preferred process for the preparation of polycarbonates is the interfacial polycondensation process. Other methods of synthesis in forming the polycarbonates of the invention such as disclosed in U.S. Pat. No. 3,912,688, incorporated herein by reference, may be used.

Suitable linear polycarbonate resins are available in commerce, for instance, Makrolon FCR, Makrolon 2600 and Makrolon 2800, all of which are bisphenol based homopolycarbonate resins differing in terms of their respective molecular weights and characterized in that their melt flow indices (MFR) per ASTM D-1238 are about 16.5–24, 13–16, 7.5–13.0 and 3.5–6.5 g/10 min., respectively. These are products of Bayer Corporation of Pittsburgh, Pa.

The linear (co)polyester suitable in the present invention comprises repeat units from at least one $C_{6-20}$ aromatic, $C_{3-20}$ aliphatic or alicyclic dicarboxylic acid and repeat units from at least one $C_{2-20}$ aliphatic glycol. Examples of the dicarboxylic acids include malonic, succinic, glutaric, adipic, pimelic, suberic, azelaic, sebacic, dodecanedioic, 1,4-, 1,5- and 2,6-decahydronaphthalene dicarboxylic acid, and cis- or trans-1,4-cyclohexane dicarboxylic acid. Examples of useful aromatic dicarboxylic acids are terephthalic acid; isophthalic acid; 4,4'-biphenyldicarboxylic acid; trans 3,3'- and trans 4,4'-stilbenedicarboxylic acid, 4,4'-dibenyldicarboxylic acid; 1,4-, 1,5'-, 2,3'-, 2,6-, and 2,7-naphthalenedicarboxylic acid. The preferred dicarboxylic acids are terephthalic and isophthalic acid or mixtures thereof.

The preferred glycol of the (co)polyester includes 2 to 8 carbon atoms. Examples include ethylene glycol, 1,2-propylene glycol, 1,3-propanediol, 1,4-butanediol, 1,5-pentanediol, 1,6-hexanediol, 1,2-, 1,3- and 1,4-cyclohexanedimethanol, neopentyl glycol, and 2,2,4,4-tetramethyl-1,3-cyclobutanediol. The preferred diols are 1,4-cyclohexanedimethanol, ethylene glycol and mixtures thereof.

The preferred linear (co)polyesters include resins having repeat units from poly(ethylene terephthalate) or poly(1,4-cyclohexylenedimethylene terephthalate). Preferred (co) polyesters comprise repeat units from terephthalic acid, isophthalic acid or mixtures thereof and 1,4-cyclohexanedimethanol. Other preferred (co)polyesters comprise repeat units from terephthalic acid and 1,4-cyclohexanedimethanol, ethylene glycol or mixtures thereof.

The preparation of the (co)polyesters follow conventional procedures well known in the art such as the process described in U.S. Pat. No. 2,901,466 which disclosure is incorporated herein by reference.

The (co)polyesters of the invention have as a rule inherent viscosity of about 0.4 to 1.0 dl/g, preferably about 0.6 to 0.8 dl/g at 25° C. in a solvent containing 60 wt. % phenol and 40 wt. % tetrachloroethane. Among the other polymeric resins suitable for modification in accordance with the inventive process, mention may be made of polyestercarbonates and thermoplastic polyurethanes which contain ester segments.

The inventive process is preferably carried out in an extruder, preferably a twin screw extruder.

In the context of the inventive process, the reacting of at least one polycyclic oligocarbonate with a linear resin for obtaining a branched resin, the degree of branching may be predetermined by selecting the relative amounts of the reactants and/or by back calculating the amount of tri- or tetra-functional group Y incorporated into the original polycyclic mixture.

The amount of branching in the final product is determined by the amount of branching agent which was incorporated into the polycyclic oligocarbonate and by the relative amounts of the polycyclic and linear resin reacted in the inventive process. For example, the incorporation of 10 mole % of a trifunctional branching agent into a polycyclic compound, and the subsequent reaction of 10 wt. % of the functional polycyclic into linear polycarbonate, results in the final containing 1 mole % of the trifunctional branching.

In terms of the amount of branching agent (defined as the amount of trifunctional Y incorporated into the polycyclic mixture), the inventive process enables the preparation of a branched resin which contains up to 10 mole %, preferably up to 2 mole % of branching agent. Preferably, the process is carried out by reacting about 60 to 99.99 percent of the linear resin and about 0.01 to 40.0 percent of the polycyclic oligocarbonate (containing trifunctional Y), the percent being relative to the total weight of the resin and oligocarbonate.

In the present work described, the molecular weights of the final modified branched polymers (both the number average and weight average molecular weight) were determined by Gel Permeation Chromatography equipped with both a refractive index and low-angle light scattering detector (GPC-LALS). Melt flow rates were determined in accordance with ASTM Standard 1238.

The invention is further illustrated but is not intended to be limited by the following examples in which all parts and percentages are by weight unless otherwise specified.

EXAMPLES

Synthesis of Polycyclic Oligocarbonates

Polycyclic-oligocarbonates were synthesized from 1,1,1-trihydroxyphenylethane (THPE) and Bisphenol A-bischloroformate (BPA) resulting in a mixture containing cyclic compounds conforming to:

(2.4 ml) was added using a syringe pump. Within 10 min. after complete bischloroformate addition, the phases were separated, washed with 1.0M HCl, then with water three times. Concentration of the product in vacuo gave nearly a quantitative yield of product containing a mixture of homo- and polycyclic oligomers (herein PC-O). The small amount of gel that forms was separated during the water washings. Alternatively, separation may be carried out by precipitation from a methylene chloride solution into an excess of acetone. The lower molecular weight polycyclics dissolved in acetone, whereas, the gel/high polymer precipitated and separated by filtration. Stripping the acetone in vacuo provided a mixture of pure homo- and polycyclic oligomers with a weight average molecular weight (Mw) of 6900 g/mol and number average molecular weight (Mn) of 4600 g/mol.

The amount of branching agent incorporated was determined hydrolytically by degrading the purified polycyclic mixture in methanolic potassium hydroxide, and by analysis

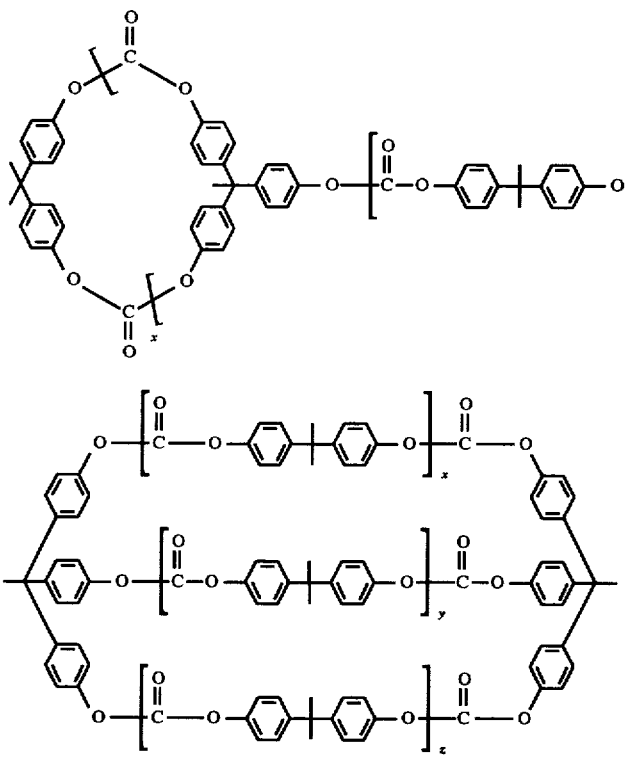
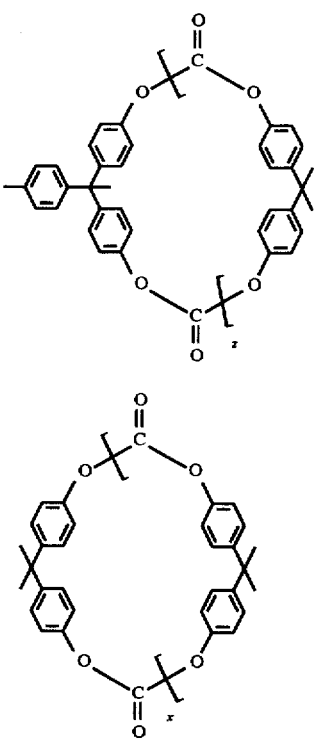

Oligomers in the mixture typically have the degree of polymerization of about 1 to 30, mostly up to about 15.

The synthesis of polycyclic oligocarbonates containing THPE was carried out as follows:

A 1.0 liter Morton flask equipped with a mechanical stirrer and condenser was charged with $CH_2Cl_2$ (200 ml), water (7 ml), NaOH (45%, 29 mmol), and $Et_3N$ (2.4 ml, 17.25 mmol). The solution was heated to reflux and vigorously stirred. A $CH_2Cl_2$/THF solution (9:1, 200 ml, 1.0M) of BPA-bischloroformate and THPE (10 mole %) was added subsurface over the tip of the impeller over 30 min., using a peristaltic pump. Concurrently over 30 min., NaOH (45%, 575 mmol) was added using a dropping funnel, and $Et_3N$ of the degradation products with high performance liquid chromatography (HPLC). This analysis confirmed the incorporation of 11.9 mole % THPE.

Example 2

PC-O were synthesized from Isatinbiscresol (IBC) and Bisphenol A-bischloroformate by applying the procedure outlined in Example 1. The products of this reaction are represented by the following structures:

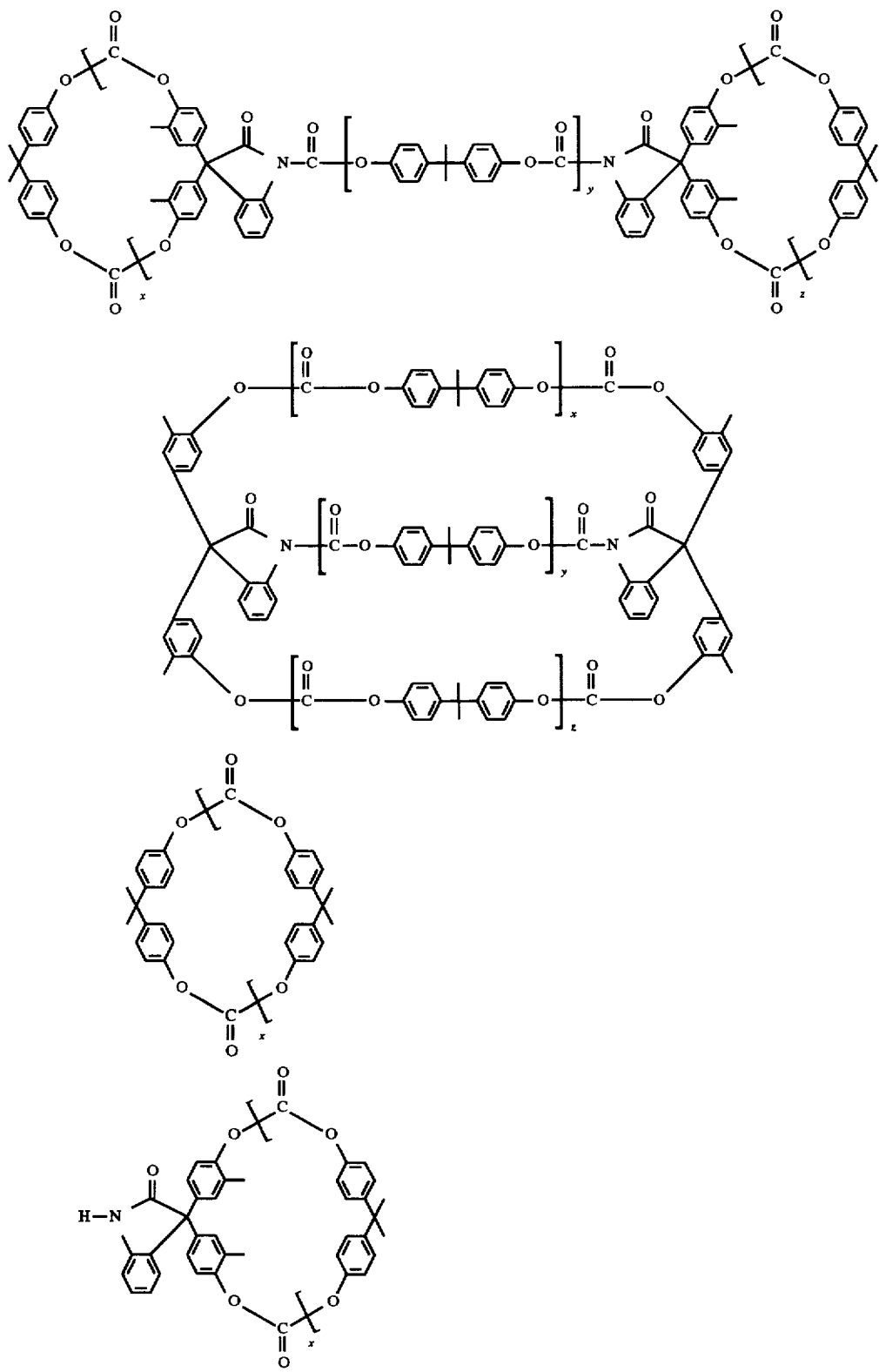

wherein x, y, and z are integers ranging from 1 to 15.

The molecular weight of the purified IBC PC-O was Mn=3100 g/mol and Mw=7800 g/mol. The amount of IBC incorporated into the purified PC-O was determined by hydrolytically degrading the product in refluxing methanolic potassium hydroxide. Analysis of the degradation products with HPLC confirmed that there was 9.4 mole % IBC incorporated.

Example 3

THPE PC-O obtained by the procedure described in Example 1 were melt processed with Makrolon 3108 polycarbonate in the presence of 150 ppm of dibutyltin oxide (DBTO) as transesterification catalyst. Melt processing was carried out in a Haake Kneader using two different levels of THPE PC-O (10 and 20 wt. %). The following conditions were used for the reaction: Time: 10 minutes; Temperature: 300° C.; RPM: 200; Atmosphere: $N_2$. After processing in the kneader, the modified polymer melt was removed, cooled, and ground into flakes. The number and weight average molecular weights (Mn, Mw) of the modified polycarbonates were determined by using gel permeation chromatography equipped with both a refractive index and a light scattering detector. The absence of low molecular weight cyclics in the GPC chromatogram confirmed the incorporation into the polycarbonate backbone. Melt flow rates (MFR) were carried out using ASTM D-1238 standard conditions at 300° C. using a 1.2 kg weight.

| Sample Composition | Mn (g/mol) | Mw (g/mol) | Mw/Mn | MFR (g/min.) |
|---|---|---|---|---|
| Makrolon 3108 (control-not processed) | 18,800 | 28,900 | 1.6 | 11.8 |
| with 10 wt. % IBC PC-O | 14,800 | 67,700 | 4,6 | 10.6 |
| with 20 wt. % IBC PC-O | 14,900 | 163,000 | 11.0 | 0.6 |

The dependence of the apparent melt viscosity on the rate of shear for these modified polycarbonates was determined at 300° C. according to ASTM D3835.

| Rate of Deformation (sec-1) | 6.7 | 16.8 | 33.5 | 67.0 | 168 | 335 | 670 | 1676 |
|---|---|---|---|---|---|---|---|---|
| Makrolon 3108 Control Melt viscosity (Pa · S.) | 512 | 426 | 409 | 399 | 389 | 366 | 325 | 248 |
| 10 wt. % IBC PC-O Melt viscosity (Pa · S.) | 2560 | 2050 | 1590 | 1230 | 850 | 690 | 460 | 310 |
| 20 wt. % IBC PC-O Melt viscosity (Pa · S.) | 18680 | 11260 | 7470 | 4610 | 2660 | 2410 | 1200 | 750 |

| Sample Composition | Mn (g/mol) | Mw (g/mol) | Mw/Mn | MFR (g/min.) |
|---|---|---|---|---|
| Makrolon 3108 (control-not processed) | 18,800 | 28,900 | 1.6 | 11.8 |
| with 10 wt. % THPE PC-O | 16,600 | 51,200 | 3.1 | 2.4 |
| with 20 wt. % THPE PC-O | 17,200* | 105,000* | 6.1* | no flow |

*Insoluble gel filtered prior to GPC analysis

The dependence of the melt viscosity on the rate of shear was determined at 300° C. according to ASTM D3835 for the modified Makrolon 3108 with varying levels of THPE PC-O.

| Rate of Deformation (sec-1) | 6.7 | 16.8 | 33.5 | 67.0 | 168 | 335 | 670 | 1676 |
|---|---|---|---|---|---|---|---|---|
| Makrolon 3108 Control Melt viscosity (Pa.S.) | 512 | 426 | 409 | 399 | 389 | 366 | 325 | 248 |
| 10 wt. % THPE PC-O Melt viscosity (Pa.S.) | 4510 | 3280 | 2510 | 1890 | 1280 | 960 | 730 | 420 |
| 20 wt. % THPE PC-O Melt viscosity (Pa.S.) | 61400 | 32350 | 19050 | 11260 | 6650 | 4860 | 3120 | 1560 |

Example 4

IBC PC-O prepared in accordance with Example 2 were melt processed (10 and 20 wt. %) with Makrolon 3108 polycarbonate in the presence of 150 ppm of DBTO as transesterification catalyst under the same conditions as in Example 3. The modified branched resin was characterized using the same conditions described previously.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of branched resin comprising transesterification reaction in the melt of (i) a polymeric resin the repeat units of which contain at least one member selected from the group consisting of ester bond and carbonate bond with (ii) at least one cyclic carbonate having a molecular weight of about 80–10000 g/mole conforming to:

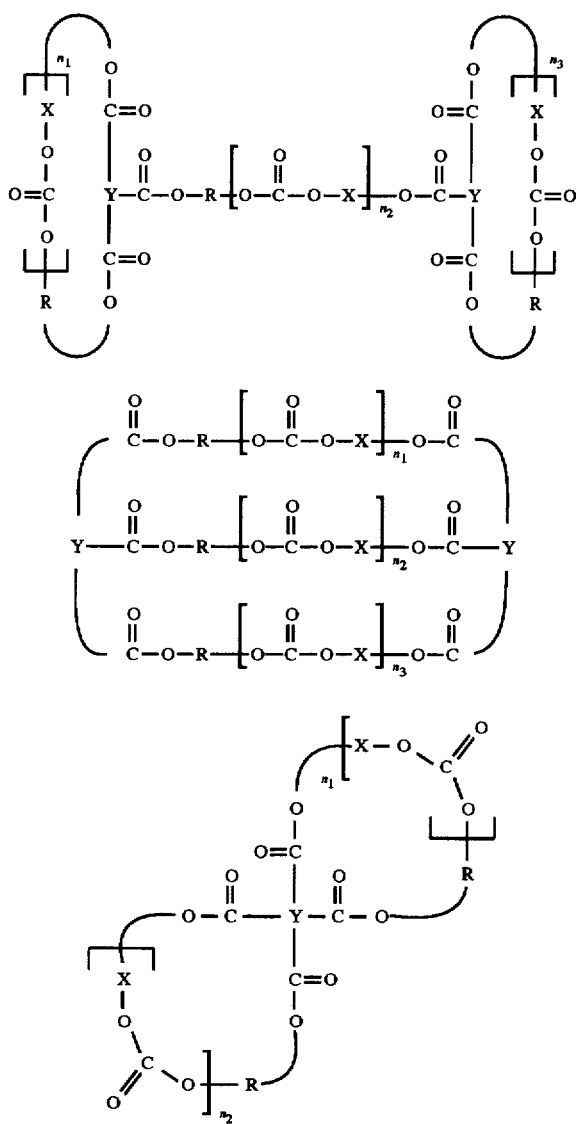

where X and R independently denote an aliphatic, cycloaliphatic or an aromatic residue of a dihydroxy compound or of a bischloroformate, Y denotes a tri-functional or a tetrafunctional moiety, and $n_1$, $n_2$, and $n_3$, independently denote an integer of 0 to 30 with the proviso that no polyhydric phenol having more than two hydroxyl groups per molecule is a reactant in said transesterification.

2. The process of claim 1 wherein a catalyst selected from the group consisting of dibutyltin oxide, cobalt(II) acetate tetrahydrate, antimony(III) oxide, manganese(II) acetate tetrahydrate, titanium(IV) butoxide, zinc acetate dihydrate, dibutyltin dilaurate, tin(II) acetate, tetramethyldiacetoxystannoxane, tin(IV) oxide, lead(II) acetate trihydrate, dibutyltin diacetate and titanium(IV) bis (ethylacetoacetate) is present.

3. The process of claim 1 wherein said reaction in the melt is carried out in an extruder.

4. The process of claim 1 wherein said reaction is carried out at temperatures in the range of 250° to 350° C. and at a residence time sufficient to enable the transesterification reaction.

5. The process of claim 1 wherein said resin is linear polycarbonate.

6. The process of claim 1 wherein said resin is linear polyester.

7. The branched resin prepared by the process of claim 1.

* * * * *